United States Patent
Motz, Jr.

[11] Patent Number: 5,375,368
[45] Date of Patent: Dec. 27, 1994

[54] PLANT SHELTER

[76] Inventor: Ronald W. Motz, Jr., P.O. Box 5234, El Dorado Hills, Calif. 95630

[21] Appl. No.: 31,138

[22] Filed: Mar. 12, 1993

[51] Int. Cl.$^5$ ............................................. A01G 13/00
[52] U.S. Cl. ............................. 47/30; 47/DIG. 6
[58] Field of Search ......... 47/29, 30, 30 OT, DIG. 6, 47/17 MO

[56] References Cited

FOREIGN PATENT DOCUMENTS

| | | | |
|---|---|---|---|
| 2621441 | 4/1989 | France | 47/30 OT |
| 2815135 | 8/1979 | Germany | 47/DIG. 6 |
| 3223445 | 12/1983 | Germany | 47/DIG. 6 |
| 59725 | 12/1982 | Japan | 47/DIG. 6 |
| 0011251 | 2/1989 | Japan | 47/DIG. 6 |
| 2129664 | 5/1984 | United Kingdom | 47/30 OT |
| 2213033 | 8/1989 | United Kingdom | 47/30 OT |
| 4897 | 8/1987 | WIPO | 47/30 OT |

OTHER PUBLICATIONS
Gardening Tips From Our Readers; Progressive Farmer; Apr. 1985; p. 134.

*Primary Examiner*—Henry E. Raduazo
*Attorney, Agent, or Firm*—Bernhard Kreten

[57] ABSTRACT

A plant shelter (10) is provided which surrounds a plant (P) and provides a microclimate (M) surrounding the plant (P) for enhanced growth of the plant (P). The plant shelter (10) is formed from a film (20) rolled into a cylindrical wall (25). The film (20) has selective absorption characteristics resulting in the film (20) shielding the plant (P) from ultra-violet radiation (U) and visible radiation which is not of a wavelength corresponding to blue light (B). The shelter (10) can be closed partially on a top edge (22) thereof to further isolate the microclimate (M) from conditions of the climate (C) outside the shelter (10).

1 Claim, 5 Drawing Sheets

PLANT SHELTER

FIELD OF THE INVENTION

The following invention relates to devices for the protection of plants from various hazards. More specifically, this invention is directed to shelters which provide a microclimate directly adjacent the plant, the microclimate improving the growth of the plant.

BACKGROUND OF THE INVENTION

Shelters have long been in use for the protection of plants from various hazards during their period of early growth. For instance, shelters can prevent animals from eating or trampling the plants and extreme wind and other elements are prevented from breaking or uprooting the young plants.

More recently, shelters have been constructed which provide a barrier which completely surrounds the young plant except at the top. These shelters are characterized by having an ability to transmit light somewhat therethrough and yet prevent wind from blowing horizontally through the shelter. In this way, a microclimate is established surrounding the young plant. This microclimate is characterized by having low wind speeds and a somewhat shaded interior. By reducing the wind adjacent the plant, dehydration of the plant through evaporation is slowed down. This allows the plant to be better nurtured and increases the likelihood that the plant will survive into maturity as a strong and healthy plant.

However, young plants are not entirely protected by these existing shelters and even when the plants survive, they are not as large and as strong as they could be if additional measures were taken. Specifically, research has shown that ultraviolet radiation is harmful to plant growth and can damage DNA of the plant. Furthermore, recent scientific evidence has shown that certain portions of the light spectrum are more photosynthetically active than others. Blue light has been shown to help repair damage caused by ultraviolet radiation by activating a repair enzyme.

Accordingly, the applicant has provided a plant shelter that is constructed of a material that absorbs ultraviolet light while transmitting most of the blue and photosynthetically active radiation therethrough. These shelters thus provide the plant with the specific portions of the light spectrum required for maximum plant growth and strength, yet filters out ultraviolet light and other portions of the light spectrum not photosynthetically active.

X-ray film typically utilizes a radiation transparent substrate upon which radiation sensitive matter (e.g. a silver emulsion) is adhered. Heretofore the substrate had only limited other uses and could not be recycled efficiently. Moreover, with only a limited secondary market, flawed or used X-ray film provides an ecological disposal problem. The film substrate has been found by the inventor to beneficially affect plant life.

The following prior art reflects the state of the art of which applicant is aware and is included herewith to discharge applicant's acknowledged duty to disclose relevant prior art. It is stipulated, however, that this reference does not teach singly nor render obvious when considered in any conceivable combination the nexus of the instant invention as disclosed in greater detail hereinafter and as particularly claimed.

PRIOR ART

Mark J. Potter, Forestry Commission, Treeshelters—Handbook 7, 1991, entire book.

The handbook by Potter teaches the use of a variety of different tree shelters for the protection of young trees. In one instance, Potter teaches transparent or translucent tubes that create a "mini-greenhouse" environment. In another instance, Potter teaches that light demanding species of trees have grown taller in brown shelters than in white or green shelters.

This invention is distinguishable from the teachings of Potter in that Potter does not discuss the benefits of shelters transmitting blue light over shelters transmitting other portions of the light spectrum. In addition, Potter does not teach the use of shelters which absorb ultraviolet radiation.

SUMMARY OF THE INVENTION

The inventor has found that the X-ray substrate, once cleaned of all material associated with light sensitive coatings, provides a superior growing environment. The plant shelter of this invention forms a barrier surrounding the young plant from as early as when the plant is merely a seed to when the grower has decided that the shelter is no longer necessary. The shelter is configured as a cylinder which is open at the top and the bottom and with a stake supporting the cylinder in a vertical orientation surrounding the plant. A bottom edge of the cylinder wall may be embedded within the soil. The wall is formed from a material which has selective radiation absorption characteristics which result in a greater proportion of blue light passing through unabsorbed than proportions of other colors of light. The wall material also absorbs ultraviolet radiation.

Once the shelter is in place around the seed or young plant, a microclimate is established within an interior of the cylinder. This microclimate is characterized by having a low wind velocity and a greater proportion of blue light therein than other colors of light. The microclimate is also exposed to less ultraviolet radiation than areas outside of the shelter.

The shelter allows the plant to retain moisture better, to receive in abundance the blue light most effective in stimulating plant growth and to be sheltered from ultraviolet radiation. In addition, the shelter prevents animals from eating or trampling the plants and provides an environment where higher concentrations of carbon dioxide can collect.

As a result, the plant is statistically more likely to grow more quickly than unsheltered plants. This phenomena can have profound benefits for reforestation, when landscaping and for commercial nurseries. With some plant material, the microclimate can be further enhanced by partially sealing off the top of the wall such that even less air circulation is allowed within the shelter.

OBJECTS OF THE INVENTION

Accordingly, it is a primary object of the present invention to provide a plant shelter which provide plants with an environment that has a lower level of ultraviolet radiation and a high proportion of blue light to the amount of all light present.

Another further object of the present invention is to provide a plant shelter which prevents wind from blowing directly against the plant.

Another further object of the present invention is to provide a plant shelter which is formed from durable materials.

Another further object of the present invention is to provide a plant shelter which is easily constructed with mass production techniques.

Another further object of the present invention is to provide a plant shelter which is formed from materials which are non-toxic to the environment.

Another further object of the present invention is to provide a plant shelter which can be transported and stored in a reduced volume form and then can be erected into a cylindrical shape for surrounding a plant.

Another further object of the present invention is to provide a plant shelter which is formed from a material which easily slides against root surfaces without damaging the root surfaces.

Another further object of the present invention is to provide a plant shelter which maintains a microclimate adjacent the plant having moderate temperature and high carbon dioxide levels.

Another further object of the present invention is to provide a plant shelter that utilizes X-ray film which has had X-ray reactive coatings removed therefrom, such that a method for reuse of X-ray film is provided.

Another further object of the present invention is to provide a plant shelter having a stake held thereto by connectors which simultaneously hold the shelter in a cylindrical shape.

Viewed from a first vantage point, it is an object of the present invention to provide a plant shelter for improving the growth of a plant in soil, comprised of: a wall having an inside surface facing the plant and an outside surface opposite the inside surface, the wall formed from a substantially transparent material which selectively absorbs less light of blue wavelength than light of other wavelengths and the plant is exposed through the wall to light having a greater proportion of blue wavelengths than the light before it impacts the outside surface.

Viewed from a second vantage point, it is an object of the present invention to provide a method for enhancing the growth rate of vegetation, including the steps of planting the vegetation in an area that receives actinic radiation; providing a filter which absorbs less electromagnetic radiation of wavelengths corresponding to the color blue than electromagnetic radiation of other wavelengths; and interposing the filter between the vegetation and the source of the actinic radiation such that at least some of the electromagnetic radiation passes through the filter before addressing the vegetation.

Viewed from a third vantage point, it is an object of the present invention to provide a plant husbandry cloche in which a plant is ensconced therein, comprised of a continuous band of material surrounding the plant, with means for supporting said band in fixed relationship with respect to the plant; and means for selectively exposing the plant to certain actinic attributes.

These and other objects will be made manifest when considering the following detailed specification when taken in conjunction with the appended drawing figures.

DESCRIPTION OF PREFERRED EMBODIMENTS

Figure 1:
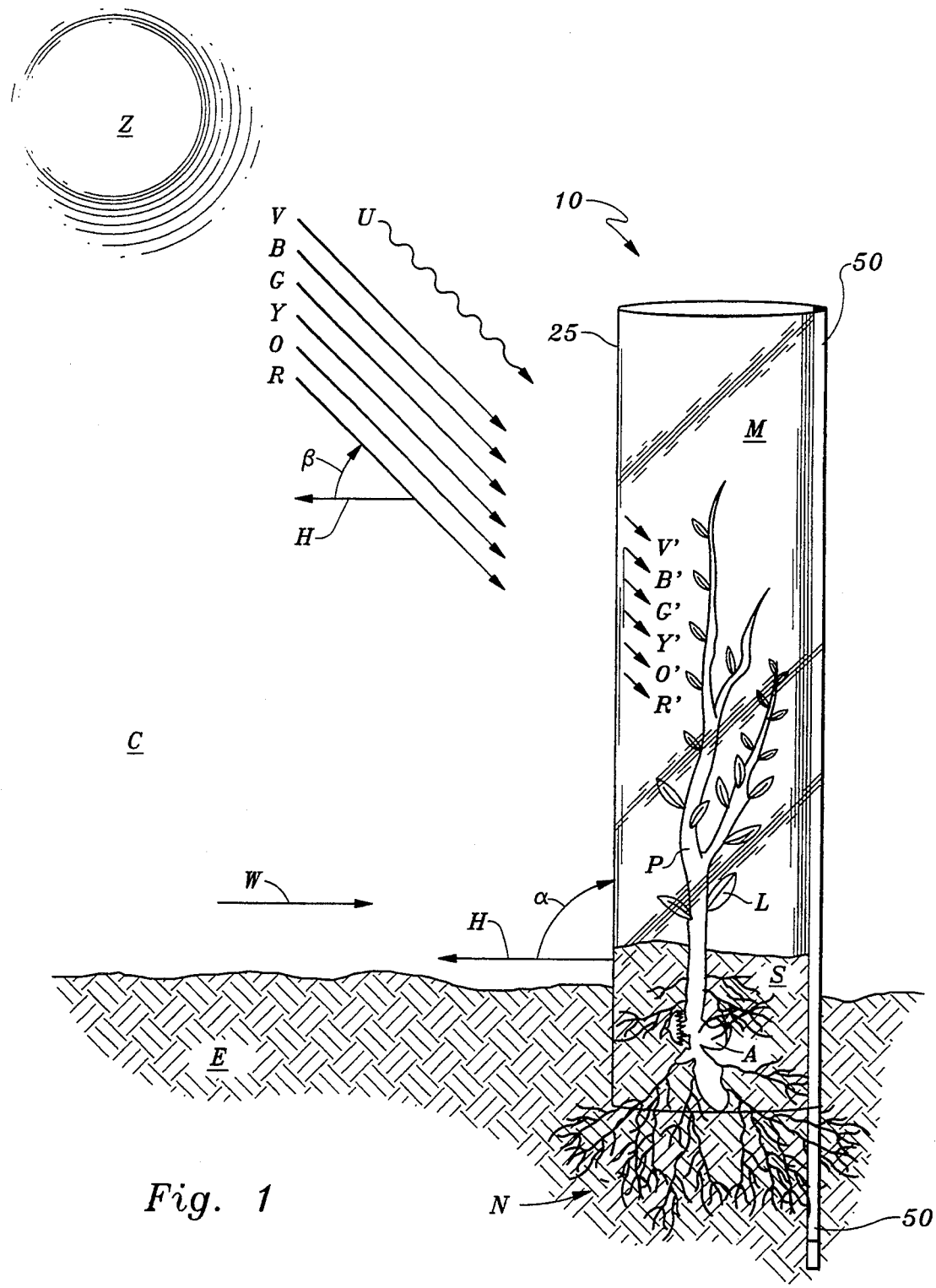
FIG. 1 is an elevational view of the device of this invention in its intended environment surrounding a young plant.
Figure 2:
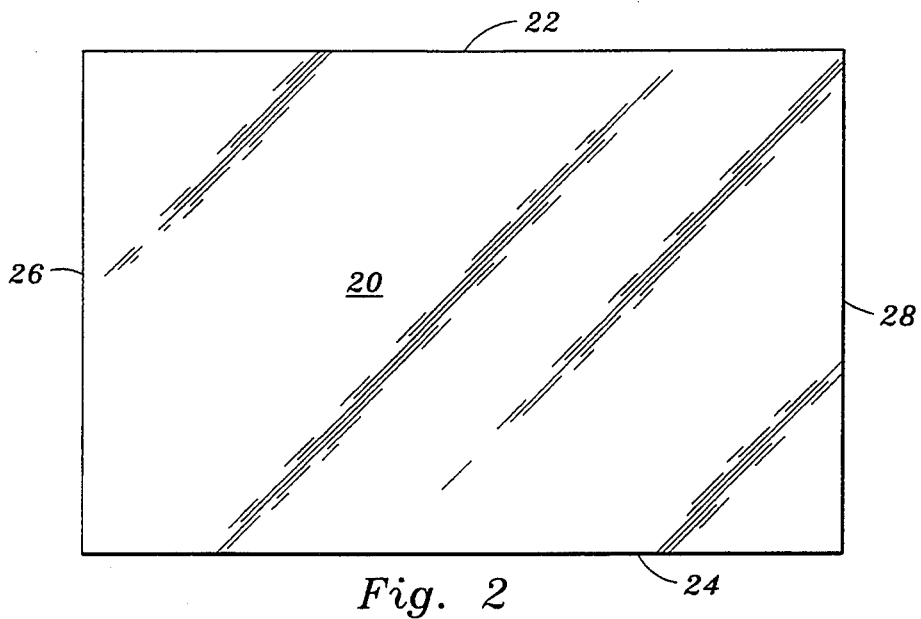
FIG. 2 is a plan view of a portion of that which is shown in FIG. 1 before it is rolled into a cylinder.
Figure 3:
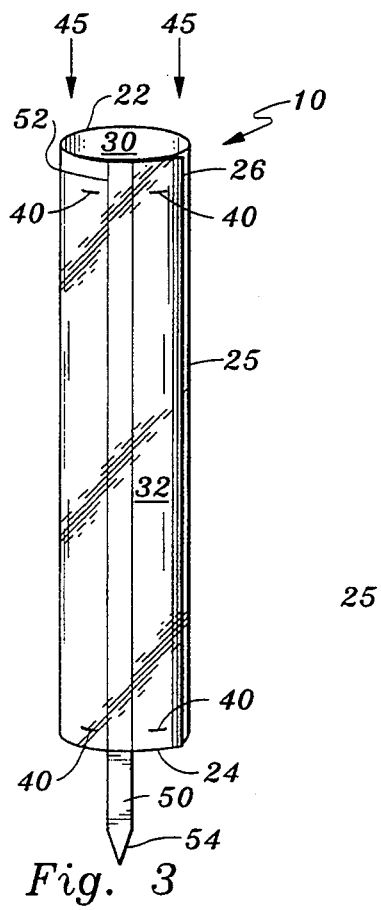
FIG. 3 is a side isometric view of the device of this invention.
Figure 4:
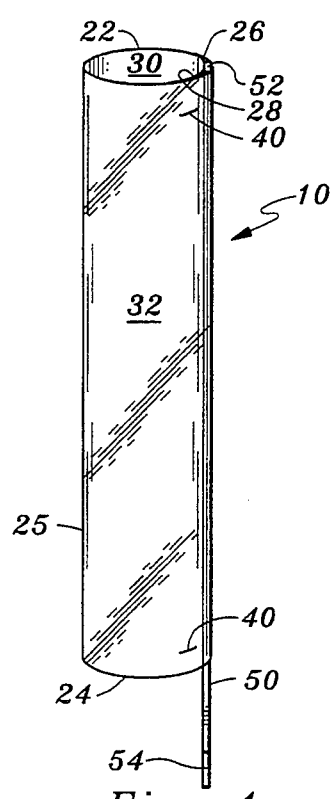
FIG. 4 is a front isometric view of that which is shown in FIG. 3.
Figure 5:
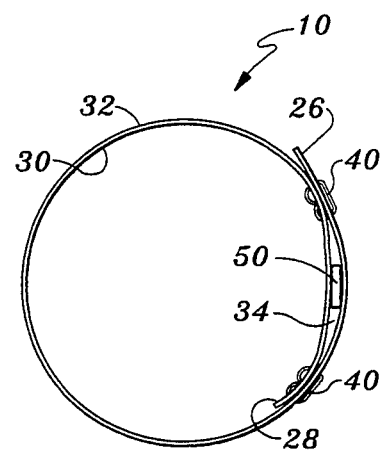
FIG. 5 is a top view of that which is shown in FIG. 3.
Figure 6:
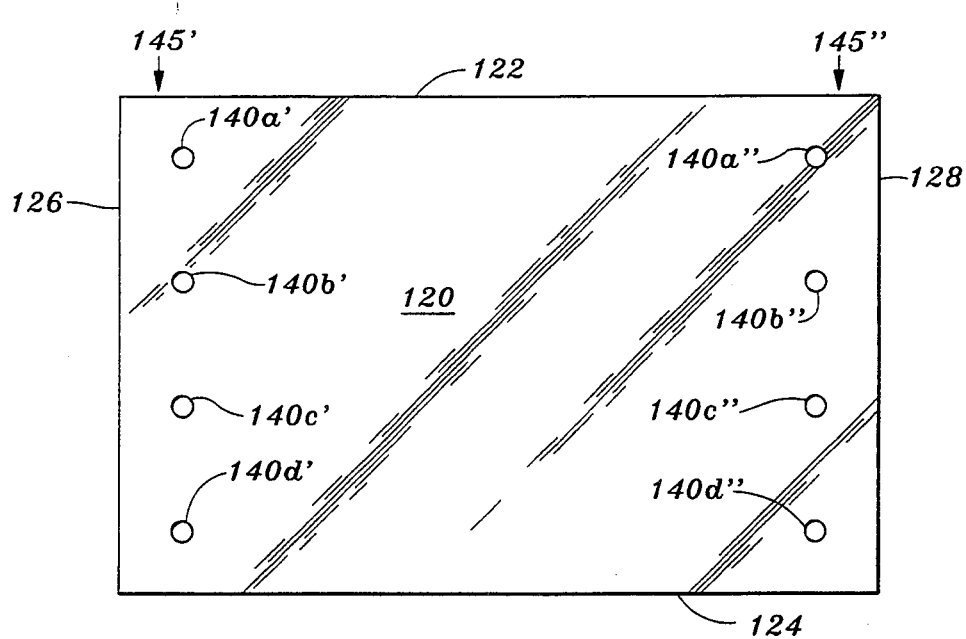
FIG. 6 is an alternative embodiment of that which is shown in FIG. 2.

Referring to the drawings wherein like reference numerals represent like parts throughout, reference numeral 10 is directed to a plant shelter for protecting a plant P from various environmental hazards.

In essence, the plant shelter 10 is formed from a rectangular piece of film 20 which is rolled into a cylindrical wall 25. The wall 25 has an inside surface 30 nearest the plant P and an outside surface 32 opposite the inside surface 30. A stake 50 is attached to the wall 25 and can be driven into the earth E to support the wall 25 around the plant P. The shelter 10 provides a microclimate M inside the wall 25 and surrounding the plant P which fosters conditions favorable to vigorous plant growth.

More specifically, and referring in detail to FIGS. 2 through 5, details of the structure of the plant shelter 10 are shown. The film 20 is preferably formed from thin flexible material shaped as a rectangle. The film 20 thus includes a top edge 22, a bottom edge 24, a first side edge 26 and a second side edge 28. The film 20 is flexible enough and has sufficient width between the side edges 26, 28 that it can be rolled into a cylindrical wall 25 with the side edges 26, 28 overlapping each other.

The wall 25 is preferably maintained in a cylindrical formation by staples 40 which pass through both of the side edges 26, 28 where the side edges 26, 28 are overlapping. The film 20 is selected with dimensions which allow the wall 25 to entirely encircle a plant P while still allowing the plant P to have sufficient room to grow. A height of the film 20 between the top edge 22 and the bottom edge 24 is preferably selected such that the plant P will not grow beyond the top edge 22 until the plant P has reached a level of maturity at which the shelter 10 is no longer required.

The staples 40 are preferably oriented in vertical columns 45 with two columns 45 of two staples 40 provided per column 45. A pocket 34 is formed between the two columns 45 of staples 40 and between the outside surface 32 of the second side edge 28 and the inside surface 30 of the first side edge 26. This pocket 34 thus extends from the top edge 22 to the bottom edge 24.

The pocket 34 is formed wide enough to allow a stake 50 to pass therethrough. The stake 50 includes a top 52 and a tip 54. The tip 54 is pointed such that the stake 50 can be driven easily into earth E (see FIG. 1). The stake 50 thus supports the wall 25 preventing the shelter 10 from being blown over by wind W or other external forces and protects the plant P from predation by animals.

Figure 11:
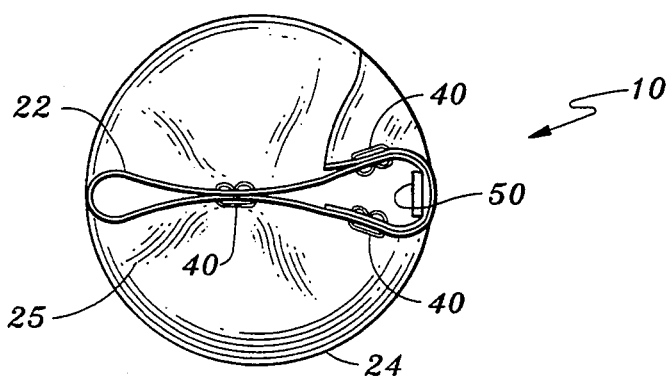
FIG. 11 is a top view of that which is shown in FIG. 1 with a top of the shelter bound by a staple.
Figure 12:
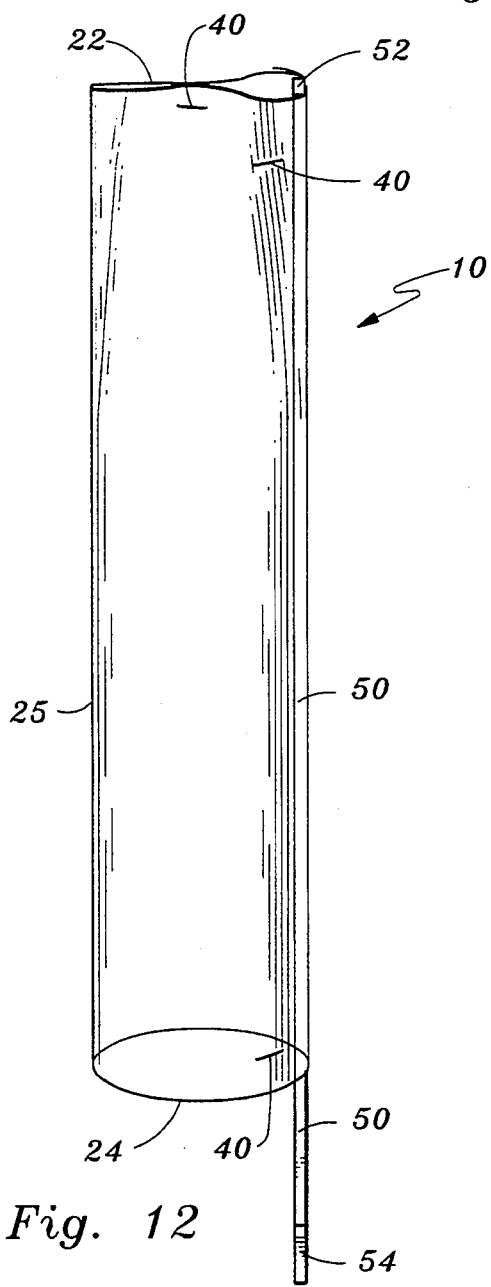
FIG. 12 is a front view of that which is shown in FIG. 1 with a top of the shelter bound by a staple.
Figure 13:
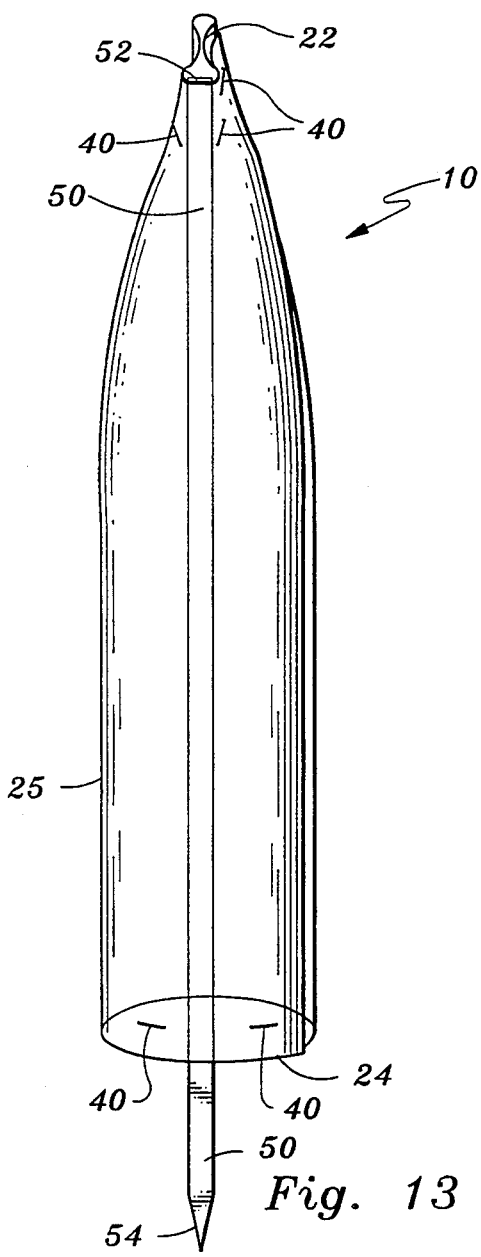
FIG. 13 is a right side view of that which is shown in FIG. 1 with a top of the shelter bound by a staple.

Referring now to FIGS. 11 through 13, an alternative to the configuration of the shelter 10, shown in FIGS. 1 through 5, is provided. The microclimate M is further contrasted from the climate C by providing a top staple 42 passing through two diametrically opposed portions of the wall 25 near the top edge 22, forming a cloche. This top staple 42 holds together the top edge 22 of the wall 25, reducing air exchange into the shelter 10. By providing the top staple 42, a more pronounced mini-greenhouse effect can be obtained within the microclimate M.

As an alternative to the top staple 42, a temperature sensitive adhesive such as wax can be used. This adhesive, not shown, would be selected to close the shelter 10 unless a maximum temperature for plant survival is exceeded. If this temperature is exceeded, the adhesive will break down, causing the shelter 10 to be opened at the top edge 22.

Referring now to FIGS. 6 through 9, an alternative embodiment 100 of the plant shelter 10 is shown. The plant shelter 100 includes a film 120 having a top edge 122, a bottom edge 124, a first side edge 126 and a second side edge 128. Dimensions of the film 120 are preferably similar to dimensions of the film 20 of the preferred embodiment.

The film 120 includes holes 140 which pass from an inside surface 130 of the film 120 to an outside surface 132 of the film 120. The holes 140 are preferably oriented into two columns 145 with each column 145 of holes 140 adjacent and parallel to the side edges 126, 128. The columns 145 of holes 140 extend from the top edge 122 to the bottom edge 124. Four holes 140a, 140b, 140c, 140d, are preferably provided in each column 145 with one hole 140' of the first column 145' in line horizontally with another hole 140" of the second column 145". However, other patterns and numbers of holes 140 can also easily be utilized.

In constructing the shelter 100, the film 120 is rolled into a cylindrical wall 125 such that the first side edge 126 overlaps the second side edge 128 until the holes 140' of the first column 145' are aligned with holes 140" of a second column 145". A pole 150 is then threaded through the holes 140 in a serpentine manner (shown in detail in FIGS. 7 and 8) to hold the first side edge 126 and the second side edge 128 together.

Attachment of the pole 150 to the film 120 can be effected in the following way. Initially, a lower end 154 of the pole 150 is passed from the inside surface 130 to the outside surface 132 of the wall 125 through hole 140a" and then through hole 140a' from the inside surface 130 to the outside surface 132. The pole 150 is then lowered (i.e. advanced in the holes as by threading) and is passed through hole 140b' from the outside surface 132 through to the inside surface 130 and then through hole 140b" from the outside surface 132 through to the inside surface 130. The pole 150 is again lowered.

Figure 7:
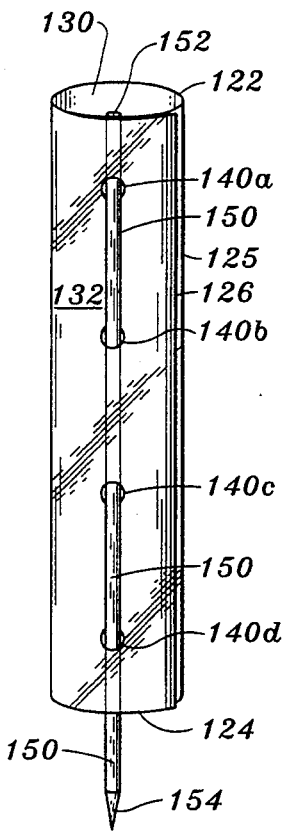
FIG. 7 is an alternative embodiment of that which is shown in FIG. 3.
Figure 8:
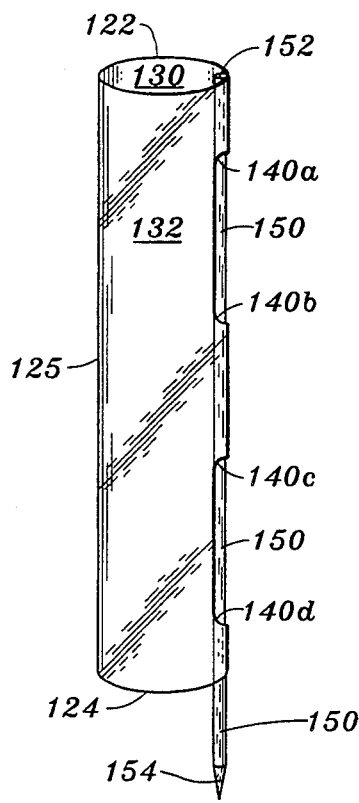
FIG. 8 is an alternative embodiment of that which is shown in FIG. 4.
Figure 9:
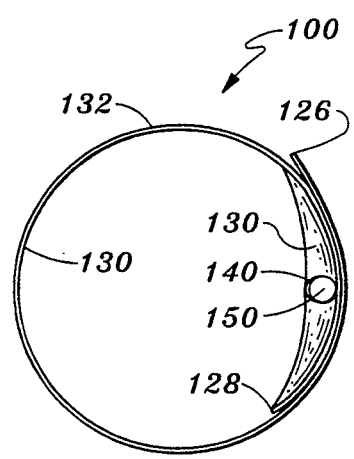
FIG. 9 is an alternative embodiment of that which is shown in FIG. 5.

This pattern of pole 150 threading is continued through holes 140c and holes 140d. The pole 150 is then advanced slightly further until an upper end 152 of the pole 150 is adjacent the top edge 122. The pole 150 is then positioned as is shown in FIGS. 7 and 8. The pole 150 is shown with the upper end 152 and lower end 154 inboard of the inside surface 130. However, this arrangement could be reversed with similar results.

Referring now in detail to FIG. 1, details of the characteristics of the film 20 (and also film 120) are described in detail. The shelter 10 surrounds the plant P to provide a microclimate M which has superior environmental conditions for plant growth than the climate C outside of the shelter 10. The microclimate M exhibits numerous distinctive characteristics from those of the climate C.

Specifically, wind velocity within the microclimate M is diminished. This feature exists because the film 20 is effectively non-foraminous, preventing the wind W from passing horizontally through the film 20. The bottom edge 24 of the film 20 is preferably imbedded into the earth E such that the wind W is prevented from passing underneath the bottom edge 24. Any wind W passing over the top edge 22 and into the microclimate M is only a small proportion of the wind velocity existing in the climate C. This small proportion could provide for access to fresh air and other plant P necessities such as any possible need for pollination. When the shelter 100 is utilized, note that the holes 140 are blocked by the pole 150 thus preventing substantial passage of the wind W therethrough.

With less wind in the microclimate M than in the climate C, the plant P is more readily able to maintain its moisture content because the wind W is not able to draw moisture off of the leaves L. Also, more moderate temperatures can be maintained without significant convective heat transfer taking place. This also causes microclimate M to exhibit greater humidity. The plant P thus maintains moisture levels corresponding to maximum growth conditions while reducing watering requirements. Also, carbon dioxide concentrations are maintained at higher levels, further encouraging plant growth.

The film 20 is preferably only selectively transparent to radiation. The film 20 preferably transmits radiation having desirable actinic attributes and absorbs all other radiation. Some forms of radiation, such as ultra-violet radiation U are harmful to the DNA of plants. The wall 25 is oriented around the plant P such that radiation from a radiation source Z passes through the film 20 before addressing the plant P.

The film 20 is composed of a substance which tends to absorb ultra-violet radiation U. Accordingly, the microclimate M is shielded from a certain proportion of the ultra-violet radiation U. One such substance having these characteristics is manufactured by the DuPont corporation under the tradename "REVVAL". This material is traditionally used as the support surface of X-ray film. Thus X-ray film, which has been stripped of photochemically active material, can be recycled as film 20 for the shelter 10. REVVAL without any additional ultraviolet absorbing coating absorbs approximately 25% of the ultraviolet radiation U which impacts it.

Also, film 20 allows visible light from the radiation source Z to be transmitted through the film 20 only to varying degrees. Specifically, the film 20 transmits a greater proportion of blue radiation B (having wavelengths between 4,550 and 4,920 angstroms) therethrough than other visible radiation from the radiation source Z. This feature of the film 20 causes the film 20 to exhibit a blue color to a viewer. One way to achieve the amplification of blue light B as a proportion of all light present is through tinting the "REVVAL" product (i.e. the reclaimed blue tinted X-ray film).

Specifically, violet radiation V having a wave length (between 3,900 and 4,550 angstroms) shorter than blue radiation B is partially absorbed such that violet radiation V' passing into the microclimate M is substantially less than the violet radiation V outside the microclimate M. Blue radiation B passes into the microclimate M with less absorption such that the blue radiation B' within the microclimate M is substantially undiminished from its intensity in the climate C.

Green radiation G (4,920–5,770 angstroms), yellow radiation Y (5,770–5,970 angstroms), orange radiation O (5,970–6,220 angstroms) and red radiation R (6,220–7,700 angstroms) that pass from the climate C into the microclimate M are diminished in a manner similar to the violet radiation V'. Accordingly, the green radiation G', yellow radiation Y', orange radiation O' and red radiation R' within the microclimate M exhibit only a portion of the intensity which they exhibited in the climate C, thus amplifying the proportionate presence of blue radiation B.

The radiation passes from the radiation source Z to the shelter 10 at an angle $\beta$ to a horizontal reference H. The wall 25 is oriented at an angle $\alpha$ to the horizontal reference H. Preferably, the angle $\alpha$ measures 90° such that the shelter 10 stands vertically. If the radiation source Z is the sun, the angle $\beta$ changes throughout the day and is determined based on the time of day, the season and the latitude of the shelter 10. At most latitudes, and at most times of day, an angle $\alpha$ of 90° insures that radiation from the radiation source Z passes through the film 20 before impacting the plant P. The plant P within the microclimate M is thus not only sheltered from ultra-violet radiation U but also receives a greater proportion of blue light B than light which is not blue light B.

If X-ray film is to be used as the film 20, the X-ray film is first cleaned of its light sensitive coatings, associated adhesives and surface treatments using protolytic enzymes, commercial solvents or other stripping methods to thereby provide an acrylic coated blue plastic (PET) film. The coating can be of PVDC available from DuPont under the tradename "Saran". It is then used for sheltering plants. X-ray film is only one possible source for the film 20 of the shelter 10.

The shelter 10 is open at the top edge 22. Accordingly, some radiation from the source Z enters an upper portion of the microclimate M. This radiation is reflected somewhat by the inside surface 30. Upon reflection, the radiation can be modified somewhat, such that reflected radiation impacting the plant P will have similar beneficial attributes to radiation passing through the film 20.

The film 20 provides a certain amount of shade to the plant P by absorbing some of the visible light. This can improve the growing performance of the plant P based on the conditions preferred by the particular plant P involved.

While the above described characteristics of the film 20 are specified in detail above, various plants P can have slightly different preferred microclimate M. Accordingly, various parameters of the shelter 10 can be modified to produce the microclimate M particularly desirable to the plant P involved. For instance, multiple layers of film 20 can be provided to increase shade within the microclimate M and to further reduce ultra-violet radiation U and increase the ratio of blue light B to the amount of non-blue light. Also, a top staple 42 can be utilized, simulating a cloche.

The film 20 is preferably formed having a relatively slick surface such that if portions of a root network N of the plant P grow adjacent to the inside surface 30 of the wall 25, the shelter 10 can still be removed by sliding the wall 25 out of the earth E without damaging fragile tips of the root network N. Thus, the shelter 10 can be easily removed for reuse or disposal without disturbing the plant P when the plant P has reached maturity. The film 20 can also be utilized in transplanting the plant P without causing excessive root network N damage, due to this slickness feature. Preferably, the wall 25 is at least initially maintained at a depth lower than lowermost portions of the root network N to further avoid root network N damage.

Figure 10:
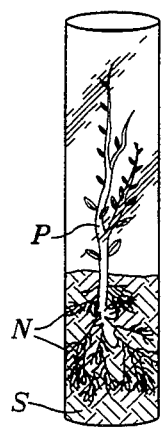
FIGS. 10 through 10G are elevational views of that which is shown in FIG. 1 during different steps in the planting and growing process.
Figure 10A:
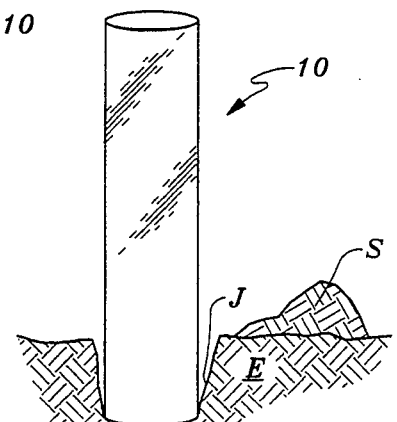
Figure 10B:
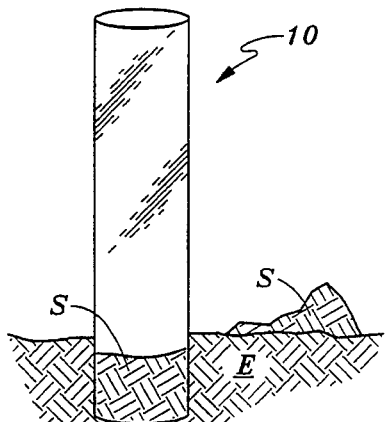

Referring now to FIGS. 10A through 10G, details of the use of the shelter 10 in growth of a plant P are shown and described. FIG. 10A shows the shelter 10 after a hole J has been dug a few inches into the earth E and the shelter 10 has been placed into the hole J. This step allows the earth E to be removed and broken up somewhat for reuse as soil S. Alternatively, soil S having more desirable characteristics may replace the earth E removed to form the hole J. A post (not shown) provides additional stability for the shelter 10.

A portion of the soil S (FIG. 10B) is then placed in an interior of the shelter 10 up to a height substantially similar to that of the earth E outside of the shelter 10.

Figure 10C:
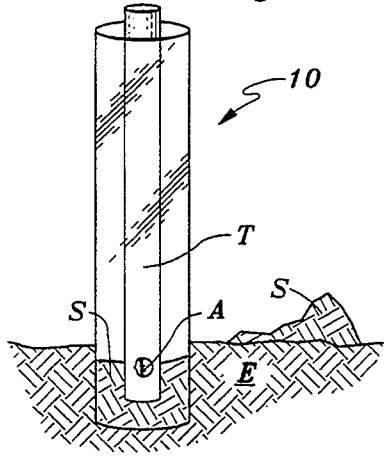

Next, a planting tube T is placed within the shelter 10 (FIG. 10C) and pushed down into the soil S a depth similar to that desired for location of the seed A. In FIG. 10C, the seed is shown as an acorn A (see also FIG. 1), but other seeds can be used. The planting tube T merely provides one way to position the seed A within the shelter 10. Other methods could also be used.

Figure 10D:
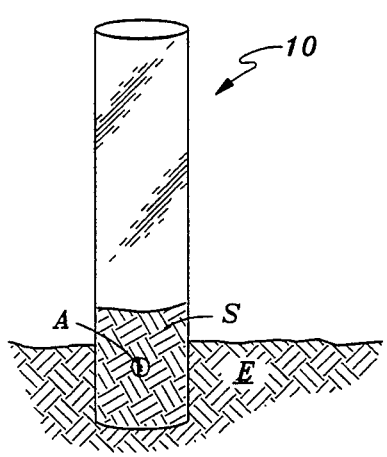

The acorn A is then dropped through the tube T such that it resides within the soil S at the desired depth. Additional soil S is then placed over the seed A (FIG. 10D).

Figure 10E:
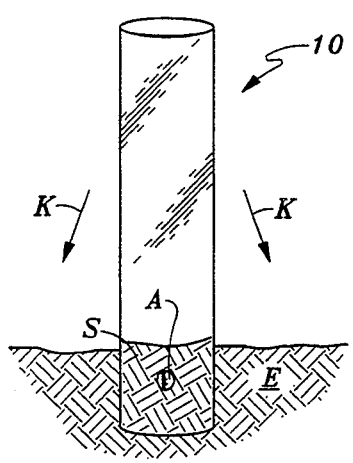

FIG. 10E shows the spraying of weedkiller K. The weedkiller K can include herbicides commonly used in agriculture such as chemicals or other weedremoving agents. A pre-emergent chemical can also be utilized to prevent the regrowth of weeds after the weedkiller has been utilized. The shelter 10 protects the acorn A during this process and ensures that any chemicals K used will not disturb growth within the shelter 10.

Figure 10F:
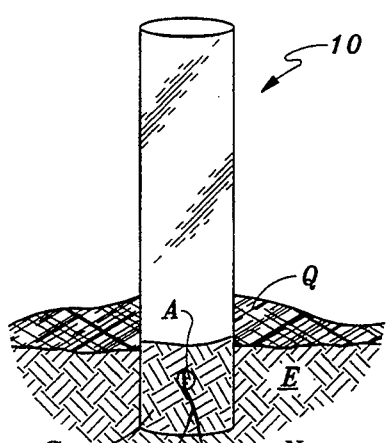

Straw Q is then placed in an area surrounding the shelter 10 (FIG. 10F). Preferably, one bale of straw Q is used to provide a two to three foot radius circle of straw surrounding the shelter 10. The straw Q inhibits dehydration of the earth E and tends also to keep soil S within the shelter 10 from becoming dehydrated. Moist soil S and earth E assist in formation of the root network N out through the shelter 10 and beyond the bottom edge 24 of the wall 25.

Figure 10G:
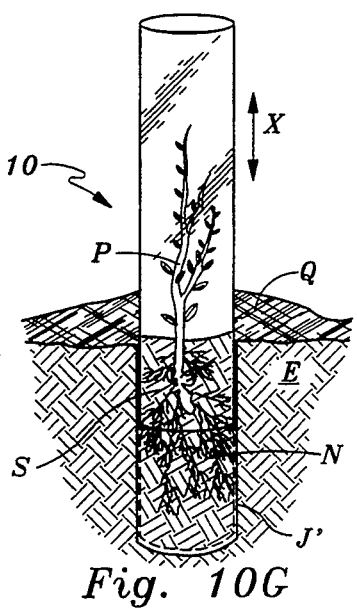

Finally, FIG. 10G shows a healthy plant P growing within the shelter 10 in a manner similar to that shown in FIG. 1. Once the plant P reaches a maturity at which susceptibility to adverse environmental conditions or animal predation has diminished, the shelter 10 can be removed from the plant P and the plant P will then be exposed to the climate C directly.

The shelter 10 can also be used in a nursery environment by only providing the soil S within the shelter 10, but not supporting the shelter 10 directly in the earth E (FIG. 10). Preferably, soil S fills a bottom half of the shelter 10 initially with the soil S exposed to the air on both an upper and lower surface. Air adjacent the soil S air prunes the root network N, preventing the creation of a spiralling tap root.

Once the plant P is ready for more root network N space, as is provided by the earth E or a larger pot or other container, the shelter 10 can be placed in the hole J' shown in FIG. 10G. Note that the shelter 10 would already have a growing plant P therein. However, the hole J' would preferably have a greater depth from the hole J, similar to half the shelter 10 height.

Once the shelter 10 is in place within the hole J', the soil S and earth E adjacent the shelter are preferably wetted and then the shelter 10 can be elevated vertically along arrow X (FIG. 10G) somewhat so that the shelter 10 can keep up with growth of the plant P for a longer period. This method avoids exposure of the root network N to air during either the transplanting process or the elevating process. Dashed lines in FIG. 10G represent position of the shelter 10 before its elevation.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A plant shelter for improving the growth of a plant in soil, comprising in combination:

a wall having an inside surface facing the plant and an outside surface opposite the inside surface, said wall formed from a substantially transparent material which selectively absorbs less electromagnetic radiation of blue wavelength than radiation of other wavelengths;

whereby the plant is exposed through said wall to radiation having a greater proportion of blue wavelengths than the radiation before it impacts said outside surface;

wherein said wall is formed from a material which absorbs ultraviolet radiation, whereby the wall reduces the amount of ultraviolet radiation to which the plant is exposed;

wherein said substantially transparent material selectively transmits a greater proportion of radiation having wavelengths selected from a group of wavelengths between four thousand two hundred and twenty-five angstroms and five thousand three hundred and forty-five angstroms;

wherein said substantially transparent material more readily transmits radiation having wavelengths selected from a group of wavelengths between four thousand five hundred and fifty angstroms and four thousand nine hundred and twenty angstroms;

wherein said wall is oriented vertically and surrounds the plant;

wherein said wall is non-foraminous, whereby wind is inhibited somewhat from impacting the plant;

wherein said shelter wall is maintained in a vertical orientation by a stake having a bottom end embedded within soil adjacent the plant and an upper end supporting said wall thereagainst;

wherein said wall is formed from a square flat flexible material and rolled into a cylinder with side edges of the wall overlapping, and wherein staples hold overlapping side edges of said wall together, said staples arranged in two horizontally spaced vertical columns with a pocket formed between the two vertical rows forming a cross-sectional area similar to a cross-sectional area of said stake, such that said stake is oriented between the two vertical rows of staples and between said overlapping side edges.

* * * * *